United States Patent [19]

Han

[11] Patent Number: 5,363,236
[45] Date of Patent: * Nov. 8, 1994

[54] MOTOR VEHICLE REAR VIEW MIRROR WIPER DEVICE

[76] Inventor: Ivan Han, No. 57-30, Ming Yi Road, Sec. 1, 34th Lin, Wu Ku Hsiang, Taipei Hsien, Taiwan, Prov. of China

[*] Notice: The portion of the term of this patent subsequent to Apr. 20, 2010 has been disclaimed.

[21] Appl. No.: 911,106

[22] Filed: Jul. 9, 1992

Related U.S. Application Data

[63] Continuation-in-part of Ser. No. 775,910, Oct. 15, 1991, Pat. No. 5,203,050.

[51] Int. Cl.⁵ .............. B60S 1/56; B60S 1/70; B60S 1/46
[52] U.S. Cl. .................. 359/509; 359/507; 15/250.003; 15/250.01; 15/250.29; 15/250.24; 15/230.36
[58] Field of Search ........... 15/250.24, 250.29, 250.30, 15/250.03, 250.04, 250.26, 250.003; 359/509, 507

[56] References Cited

U.S. PATENT DOCUMENTS

| | | | |
|---|---|---|---|
| 1,737,473 | 11/1929 | Mesi | 15/250.24 |
| 2,648,087 | 8/1953 | Kiker | 15/250.29 |
| 3,032,797 | 5/1962 | Presser | 15/250.24 |
| 3,042,954 | 7/1962 | Wynn et al. | 15/250.24 |
| 3,289,237 | 12/1966 | Lindsey | 15/250.24 |
| 3,295,004 | 12/1966 | Hirsch | 15/250.01 |
| 4,320,554 | 3/1982 | Tomura et al. | 15/250.003 |
| 5,203,050 | 4/1993 | Han | 15/250.003 |

FOREIGN PATENT DOCUMENTS

| | | | |
|---|---|---|---|
| 947532 | 8/1956 | Germany | 15/250.29 |
| 1093236 | 11/1960 | Germany | 15/250.29 |
| 2152978 | 4/1973 | Germany | 15/250.29 |
| 0008953 | 1/1980 | Japan | 15/250.24 |
| 218579 | 7/1924 | United Kingdom | 15/250.29 |

*Primary Examiner*—David A. Scherbel
*Assistant Examiner*—Gary K. Graham
*Attorney, Agent, or Firm*—Morton J. Rosenberg; David I. Klein

[57] ABSTRACT

A motor vehicle rear view mirror wiper device comprising a rear view mirror case connected to the body of a car by a contracting member and having a slide holder mounted thereon to hold a lens, two slides mounted on said slide holder and moved by a piston and a cross wire to carry a wiper blade in cleaning the lens.

7 Claims, 6 Drawing Sheets

MOTOR VEHICLE REAR VIEW MIRROR WIPER DEVICE

This Patent Application is a Continuation-in-Part patent application of U.S. patent application Ser. No. 07/776,910, filed on 15 Oct. 1991, now U.S. Pat. No. 5,203,050 issued on 20 Apr. 1993.

BACKGROUND OF THE INVENTION

A motor vehicle generally has a windshield wiper controlled to remove water and dust from the windshield glass thereof during the rain so that the driver can see through the windshield clearly while driving. Since the rear view mirrors of a motor vehicle may also be contaminated by dust or blocked up by rain water, they must be protected against rain water and washed regularly so as to clearly reflect the images of objects. The present invention has been accomplished under the aforesaid circumstances.

SUMMARY OF THE INVENTION

The present invention provides a wiper device for cleaning a motor vehicle's rear view mirror which comprises a rear view mirror case connected to the body of a car by a connecting member and having a slide holder mounted thereon to hold a lens, two slides mounted on the slide holder and moved by a piston and a cross wire to carry a wiper blade in cleaning the lens.

BRIEF DESCRIPTION OF THE DRAWINGS

FIG. 6-A illustrates that the bottom roller prevents the slide from oscillating up and down;

FIG. 7-A illustrates that the side rollers prevent the slide from oscillating leftward and rightward;

FIG. 8-A illustrates that the upper rollers prevent the slide from oscillating up and down;

FIG. 11-A is a partly enlarged view of the perforated water tube; and

DETAILED DESCRIPTION OF THE PREFERRED EMBODIMENTS

Figure 1:
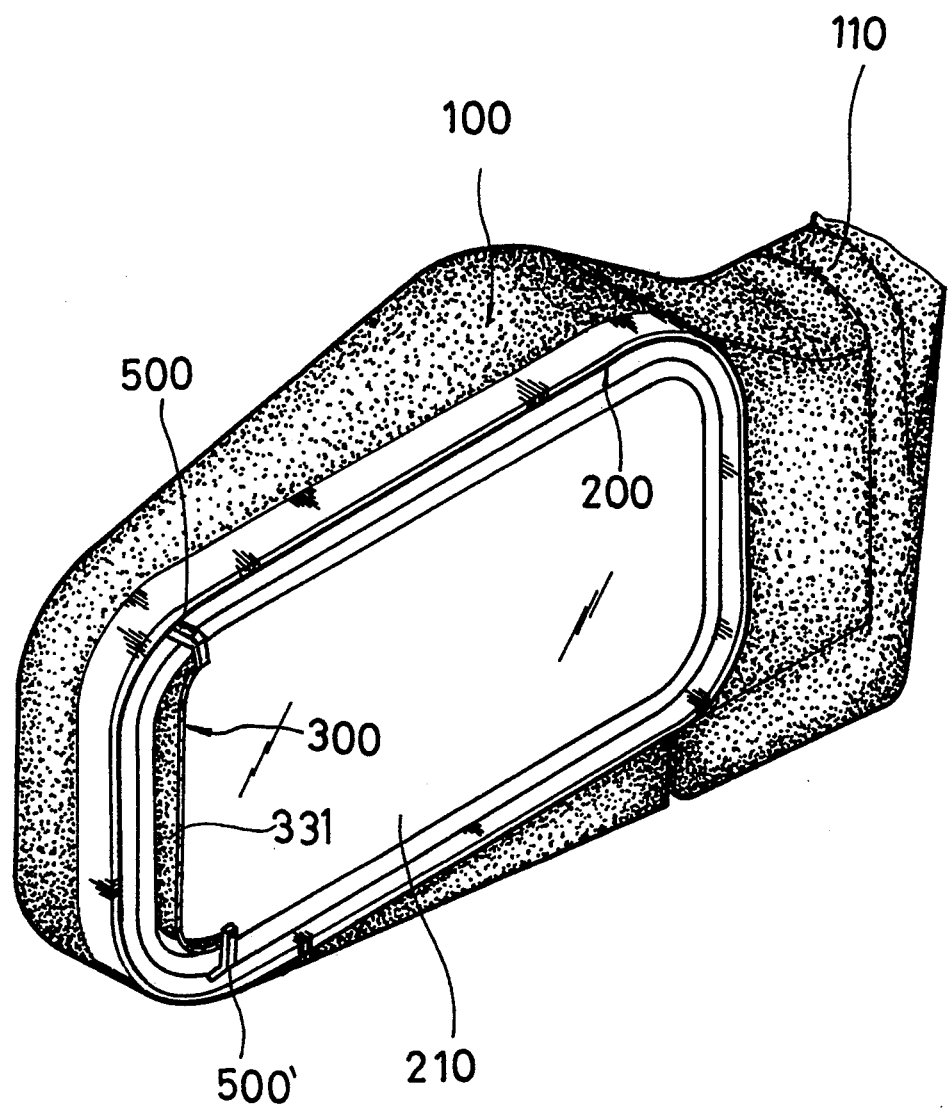
FIG. 1 is an elevational view of the preferred embodiment of the wiper device of the present invention.

Referring to FIG. 1, a wiper device is generally comprised of a rear view mirror case 100 connected to the body of a car by a connecting member 110 and having a slide holder 200 mounted thereon to hold a lens 210, and two slides 500,500' controlled to carry a wiper blade assembly 300 in removing water from the lens 210.

Figure 2:
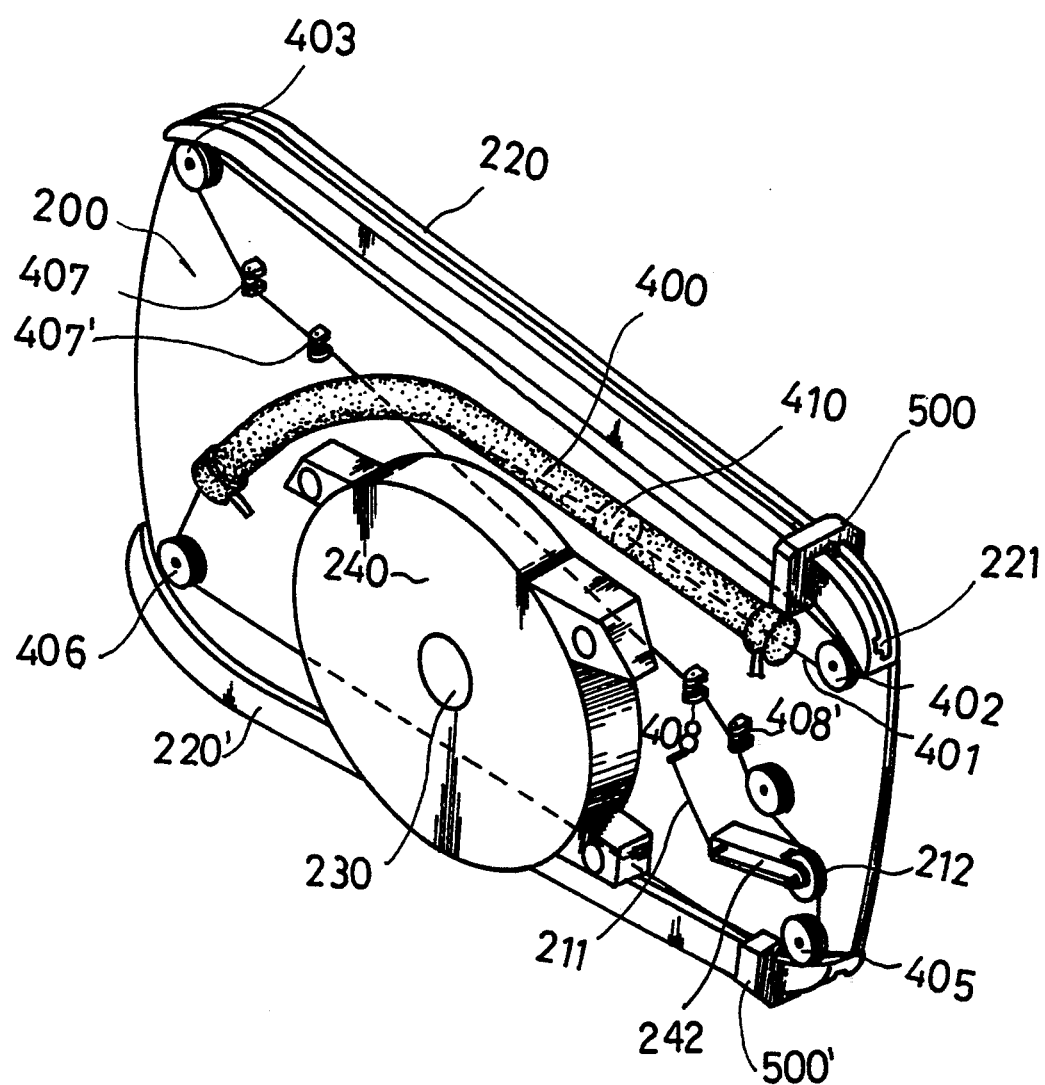
FIG. 2 is a perspective back view of the slide holder of the wiper device.
Figure 3:
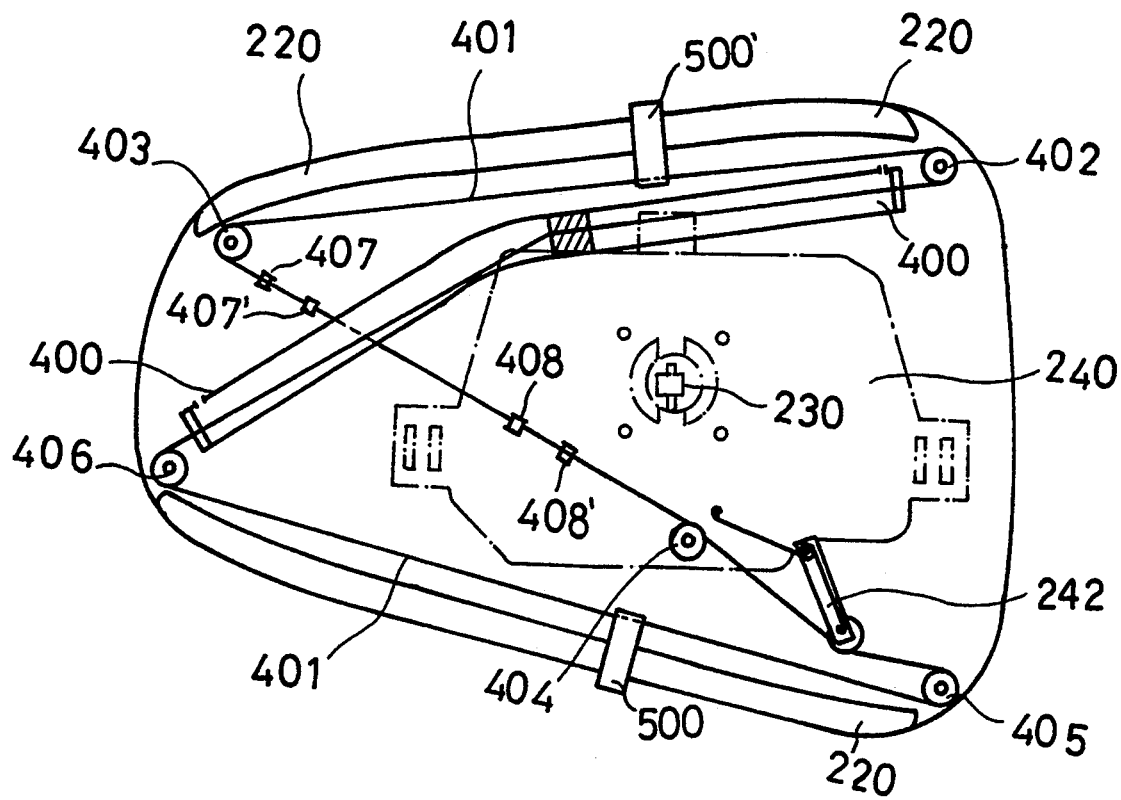
FIG. 3 is a plain view of the slide holder of the wiper device showing the internal arrangement thereof.

Referring to FIGS. 2 and 3 and seeing FIG. 1 again, a curved cylinder 400 is mounted on the slide holder 200 behind the lens 210 with the piston 410 of the cylinder 400 connected with a pull wire 401. The pull wire 401 is made from a resilient material arranged into a cross belt having one end connected to one end of the piston 410, and an opposite end wound through driven wheels 402,403, guide wheels 407,407',408,408', guide wheels 405,406 and then connected to the opposite end of the piston 410 again. Therefore, moving the piston 410 back and forth causes the pull wire 401 to rotate on the wheels 402,403,405,406 back and forth. There is also provided a tension regulator 240 to adjust the tension of the pull wire 401, which is fastened to the slide holder 200 by a lock pin 242, and consisted of a spring 211 and a pulley wheel 212.

The slide holder 200 comprises two slides 500,500' mounted on two opposite rails 220,220' thereof and driven by the pull wire 401 to alternatively slide back and forth. The pull wire 401 is inserted through holes (not shown) on the slides 500,500' and fastened up with the slides 500,500' through any of a variety of joints. Therefore, moving the piston 410 causes the pull wire 401 to carry the slides 500,500' along the rails 220,220' respectively. The slide holder 200 further comprises universal joints and stop means 230 so that the slide holder 200 can be conveniently adjusted to the desired angle. These universal joints and stop means 230, are not within the scope of the present invention, and therefore they are not described in detail.

Figure 4:
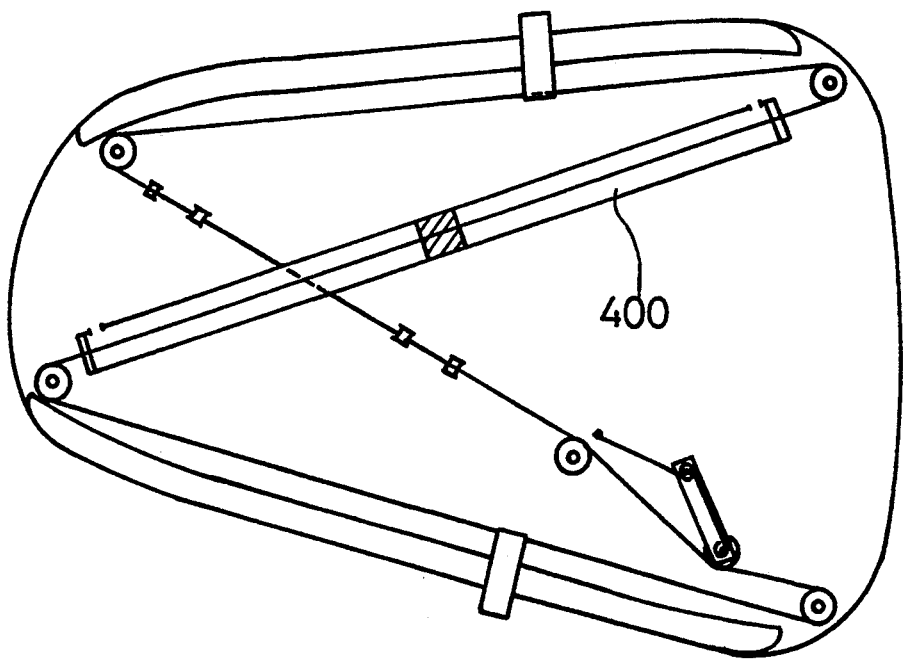
FIG. 4 illustrates an alternate form of the cylinder.

Referring to FIG. 4, therein illustrated is an alternate form of the cylinder 400'. In this alternate form, the cylinder 400' is made in a straight form and arranged in a slanting.

Figure 5:
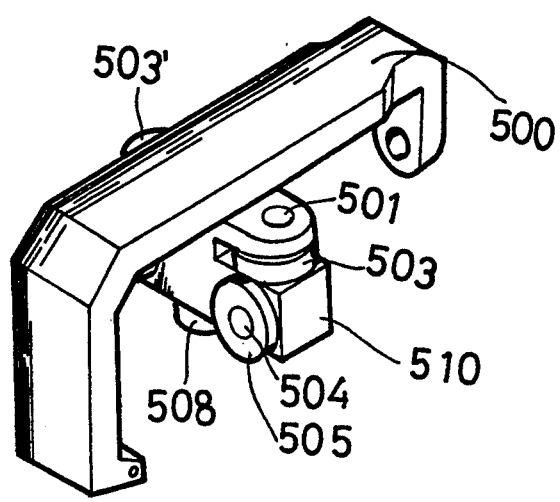
FIG. 5 is an elevational view of the slide.
Figure 9:
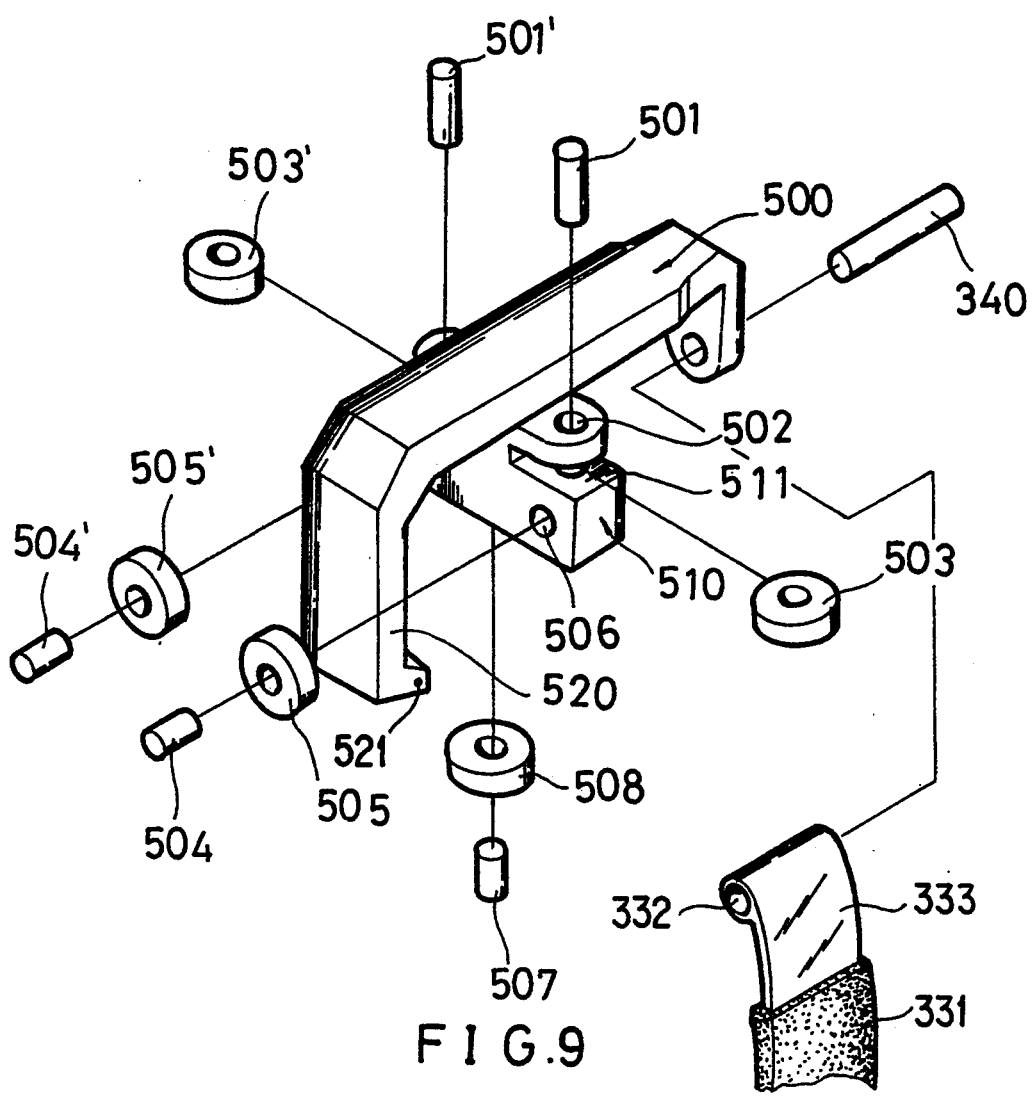
FIG. 9 is an exploded view of the slide.

Referring to FIGS. 6, 6A, 7, 7A, 8, 8A and 12 such illustrate the arrangement of the slide 500 on the rail 220. As illustrated in FIGS. 5 and 9, the rail 220 has a groove 221 into which the base 510 of the slide 500 is inserted. The base 510 of slide 500 comprises two horizontal grooves 511 and two vertical through holes 502 at two opposite ends. By inserting two pins 501,501' into the two vertical through holes 502, two opposite upper rollers 503,503' are respectively revolvably retained in the two horizontal grooves 511. By inserting two pins 504,504' into two opposite through holes 506 on the base 510 at one side, two side rollers 505,505' are respectively revolvably secured to the base 510 at one side at two opposite ends. By inserting a pin 507 into a hole (not shown) on the bottom edge of the base 510, a bottom roller 508 is revolvably secured to the base 510 at the bottom.

Figure 6:
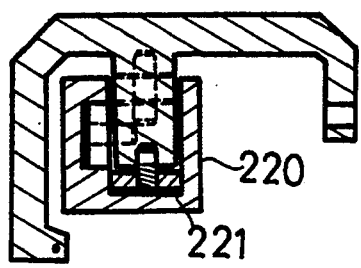
FIG. 6 is a side view of the slide.
Figure 6A:
Figure 7:
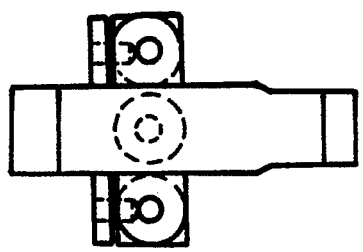
FIG. 7 is a top view of the slide.
Figure 7A:
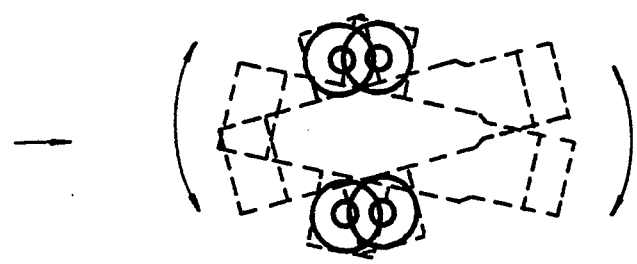
Figure 8:
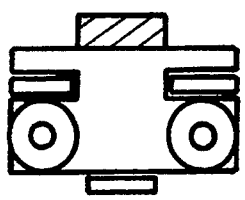
FIG. 8 is a back view of the slide.
Figure 8A:
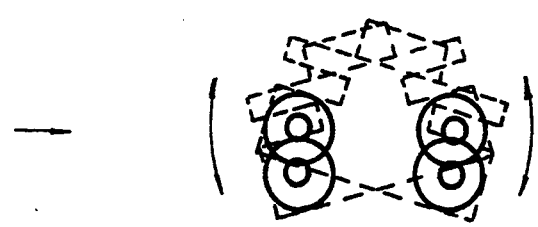

Referring to FIGS. 5, 6, 6-A and 9, the slide 500 is mounted on the rail 220 with the upper rollers 503,503', the side rollers 505,505' and the bottom roller 508 received inside the groove 221. The upper rollers 503,503' and the bottom roller 508 prevent the slide 500 from oscillating up and down. The side rollers 505,505' prevent the slide 500 from oscillating leftward and rightward. Therefore, by means of the arrangement of the rollers 503,503',505,505',508 the slide 500 is maintained stable while driven to slide along the rail 220.

Figure 10:
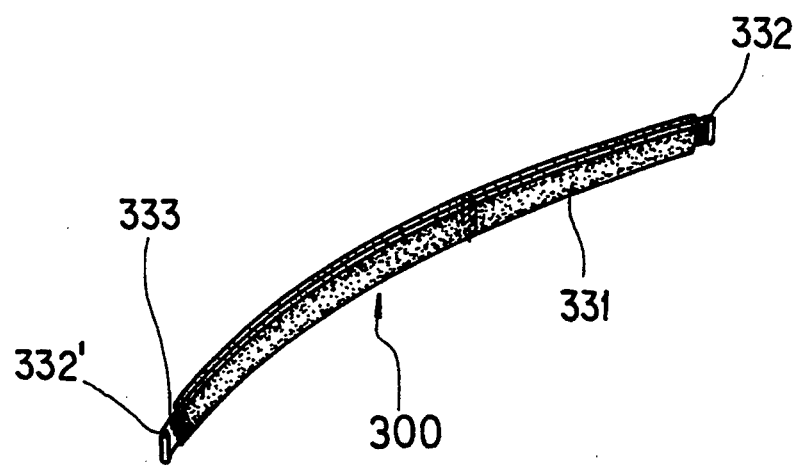
FIG. 10 is an elevational view of the wiper blade.

Referring to FIG. 10, a wiper blade assembly 300 is connected between the two slides 500,500' on the two rails 220,220' of the slide holder 200. As illustrated in FIGS. 1,2,3,9 and 10, the wiper blade assembly 300 is comprised of a rubber blade 331 held by a blade holder 333. The blade holder 333 is made from a metal spring having fastening holes 332,332' at two opposite ends respectively connected to holes on the front ends 510 of the slides 500,500' by pins 340. The pull wire 401 is inserted through holes 521 on the rear ends 520 of the slides 500,500'. After the pull wire 401 has been inserted through the holes 521, the holes 521 is sealed tightly causing the rear ends 520 of the slides 500,500' fastened to the pull wire 401, and theefore rotating the pull wire 401 causes the slides 500,500' to be moved along the rails 200,200'.

Figure 11:
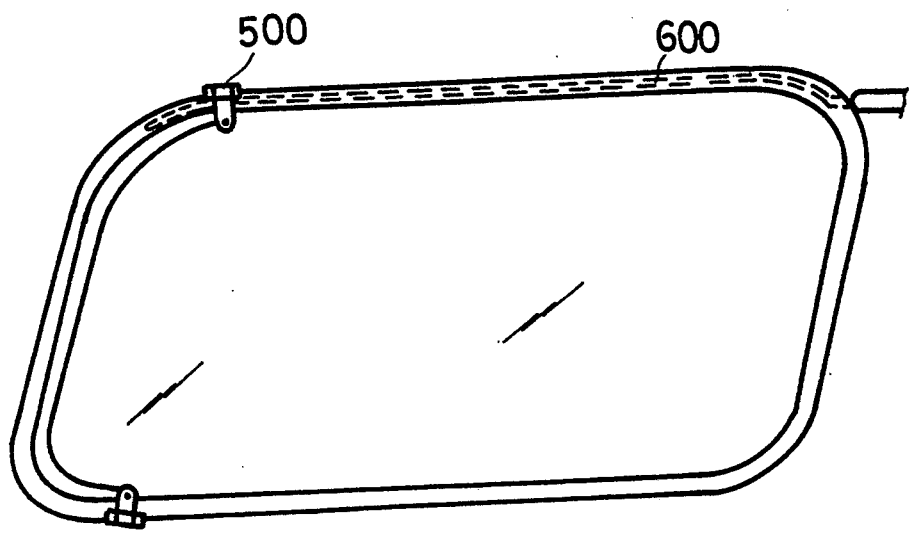
FIG. 11 illustrates the arrangement of the perforated water tube on the lens and the slide holder.
Figure 11A:
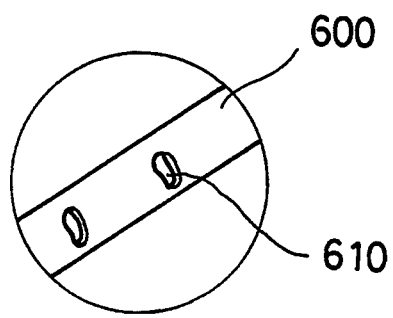
Figure 12:
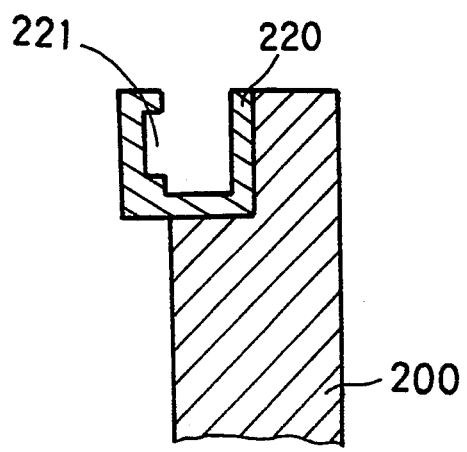
FIG. 12 is a cross section of the rail.

Referring to FIGS. 11 and 11-A, a perforated water tube 600 which is connected to a motor vehicle's windshield washer is fastened to the slide holder 200 along the top edge thereof. The arrangement of the perforated water tube 600 does not obstruct the movement of the slides 500,500'. Turning on the windshield washer causes the perforated water tube 60 to spray water over the lens 210 for cleaning.

What is claimed is:

1. A motor vehicle rear view mirror wiper device comprising:
    a rear view mirror case connected to a body of a motor vehicle;
    a slide holder forming a substantially planar plate member having a front surface, a rear surface, a top edge and a bottom edge, said slide holder being fastened to said rear view mirror case, said slide holder having a first rail extending along said top edge thereof and a second rail extending along said bottom edge thereof;
    a lens secured to said front surface of said slide holder;
    two slides respectively movably mounted on said first and second rails, each of said slides having a first pair of rollers rotatable about a pair of spaced apart vertical axes and a second pair of rollers rotatable about a pair of spaced apart horizontal axes, said second pair of rollers being captured within grooves formed in respective first and second rails, each of said first and second pairs of rollers rollingly engaging a respective wall of a respective rail defined by a respective one of said grooves;
    a wiper blade assembly connected to and extending between said two slides for removing water from said lens;
    drive means mounted to said rear surface of said slide holder and coupled to said two slides for displacement thereof back and forth on said first and second rails respectively causing said wiper blade assembly to remove water from said lens; and
    a perforated water spraying tube mounted on said slide holder along said top edge thereof and connected to a motor vehicle's windshield washer, said perforated water spraying tube having a plurality of water outlet holes through which water can be sprayed over said lens.

2. The motor vehicle rear view mirror wiper device according to claim 1, wherein said drive means includes
    a cylinder mounted to said rear surface of said slide holder;
    a piston displaceable within said cylinder and having a pair of opposing ends;
    a pull wire secured on opposing ends thereof to a respective one of said opposing ends of said piston for reversible displacement thereof, said pull wire being secured to each of said two slides for respective displacement of said two slides responsive to a displacement of said pull wire.

3. The motor vehicle rear view mirror wiper device according to claim 2, wherein said drive means further includes a plurality of wheels rotatively coupled to said rear surface of said slide holder, said pull wire being wound through said plurality of wheels, said pull wire formed into the configuration of a crossed belt and driven by said piston to move said slides back and forth on said first and second rails, causing said wiper blade assembly to alternatively move back and forth on said lens.

4. The motor vehicle rear view mirror wiper device according to claim 3, wherein said drive means further includes tension regulator means mounted to said rear surface of said slide holder and coupled to said pull wire for maintaining tension in said pull wire.

5. The motor vehicle rear view mirror wiper device according to claim 1, wherein each of said slides includes a base movably fastened in a respective one of said grooves formed in said first and second rail.

6. The motor vehicle rear view mirror wiper device according to claim 5, wherein each of said slide bases includes said pair of first rollers, said pair of second rollers and a bottom roller driven to move in a respective one of said grooves, each of said slide bases having rotatably mounted thereon, (1) a respective pair of said first and second rollers, and (2) said bottom roller.

7. The motor vehicle rear view mirror wiper device according to claim 6, wherein said first pair of rollers and said bottom roller are captured in said groove to prevent said slides from oscillating about a first axis said second pair of rollers being captured in a side recess of said groove to prevent said slides from oscillating about a second axis substantially normal said first axis.

* * * * *